US010450943B2

(12) United States Patent
Geyko et al.

(10) Patent No.: US 10,450,943 B2
(45) Date of Patent: Oct. 22, 2019

(54) OTTO AND DIESEL CYCLES EMPLOYING SPINNING GAS (71) Applicants: Vasily Geyko, Hamilton Township, NJ (US); Nathaniel Fisch, Princeton, NJ (US)

(72) Inventors: Vasily Geyko, Hamilton Township, NJ (US); Nathaniel Fisch, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 743 days.

(21) Appl. No.: 14/669,936

(22) Filed: Mar. 26, 2015

(65) Prior Publication Data
US 2015/0275744 A1 Oct. 1, 2015

Related U.S. Application Data (60) Provisional application No. 61/971,320, filed on Mar. 27, 2014.

(51) Int. Cl.
F02B 31/02 (2006.01)
F02B 31/04 (2006.01)
F02B 75/28 (2006.01)

(52) U.S. Cl.
CPC ............. *F02B 31/02* (2013.01); *F02B 31/04* (2013.01); *F02B 75/28* (2013.01); *Y02T 10/146* (2013.01)

(58) Field of Classification Search
CPC .... F02N 2200/102; F02B 31/02; F02B 75/28; F02B 31/04; Y02T 10/146

(Continued)

(56) References Cited

U.S. PATENT DOCUMENTS 1,650,812 A * 11/1927 Wingler ................. F02B 73/00
123/52.1
1,859,329 A * 5/1932 De Lautour .......... F02F 1/4235
123/306

(Continued)

OTHER PUBLICATIONS

Geyko, V. et al "Enhanced Efficiency of Internal Combustion Engines by Employing Spinning Gas", Department of Astrophysical Sciences, Princeton University, (Feb. 14, 2014).

(Continued)

*Primary Examiner* — Xiao En Mo
(74) *Attorney, Agent, or Firm* — Meagher Emanuel Laks Goldberg & Liao, LLP (57) ABSTRACT

An internal combustion engine is disclosed and includes a main cylinder and main piston that are relatively axially displaceable along a main axis to define a variable volume main working chamber. At least one valve is configured to admit air and fuel into the working chamber forming an air/fuel mixture. The main cylinder is configured to cause the air/fuel mixture in the main cylinder to spin rapidly enough to cause a substantive change in the heat capacity of the air/fuel mixture creating a spinning air/fuel mixture. The main cylinder and main piston are configured to compress the spinning air/fuel mixture to create an ignitable spinning air/fuel mixture. The spinning air/fuel mixture is ignited and the main cylinder and main piston are configured to extract mechanical energy from the ignited spinning air/fuel mixture. An exhaust valve is configured to exhaust combustion products from the main working chamber.

9 Claims, 7 Drawing Sheets (58) Field of Classification Search
USPC .............. 123/52.1, 52.2, 52.3, 306, 51, 48 D
See application file for complete search history.

(56) References Cited

U.S. PATENT DOCUMENTS

| | | | | |
|---|---|---|---|---|
| 1,879,910 | A * | 9/1932 | Robertson | F02B 75/282 |
| | | | | 123/301 |
| 3,340,854 | A * | 9/1967 | Foster | F02B 25/00 |
| | | | | 123/257 |
| 3,446,192 | A * | 5/1969 | Woodward | F02B 19/06 |
| | | | | 123/47 R |
| 4,313,410 | A * | 2/1982 | Kunii | F02B 31/08 |
| | | | | 123/308 |
| 4,389,988 | A * | 6/1983 | Ong | F02B 31/04 |
| | | | | 123/188.14 |
| 4,640,234 | A * | 2/1987 | Olsson | F02B 69/04 |
| | | | | 123/25 C |
| 4,721,126 | A * | 1/1988 | Horii | B65G 53/58 |
| | | | | 137/1 |
| 4,760,821 | A * | 8/1988 | Aupor | F02B 31/06 |
| | | | | 123/188.14 |
| 4,964,384 | A * | 10/1990 | Getz | F01L 3/10 |
| | | | | 123/188.4 |
| 5,231,963 | A * | 8/1993 | Perkins | F02M 29/02 |
| | | | | 123/306 |
| 5,322,043 | A * | 6/1994 | Shriner | F02B 17/00 |
| | | | | 123/295 |
| 5,560,326 | A * | 10/1996 | Merritt | F02B 19/02 |
| | | | | 123/259 |
| 6,467,454 | B1 * | 10/2002 | Fledersbacher | F02B 17/005 |
| | | | | 123/301 |
| 6,578,533 | B1 * | 6/2003 | Gray, Jr. | F02B 1/12 |
| | | | | 123/48 D |
| 6,701,964 | B1 * | 3/2004 | Maurice | F02B 29/02 |
| | | | | 123/306 |
| 6,837,213 | B1 * | 1/2005 | Burnett | F02B 31/00 |
| | | | | 123/184.21 |
| 6,938,588 | B2 * | 9/2005 | Jacobsen | F01B 11/00 |
| | | | | 123/305 |
| 7,021,279 | B1 * | 4/2006 | Pott | F02B 31/00 |
| | | | | 123/301 |
| 7,581,526 | B2 * | 9/2009 | Lehmann | F02F 3/10 |
| | | | | 123/269 |
| 8,550,042 | B2 * | 10/2013 | Taylor | F02B 25/04 |
| | | | | 123/65 VC |
| 9,534,560 | B2 * | 1/2017 | Coates | F01N 5/02 |
| 2013/0231848 | A1 * | 9/2013 | Roberts | F02N 11/0807 |
| | | | | 701/112 |
| 2016/0297415 | A1 * | 10/2016 | Kato | B60W 30/18118 |

OTHER PUBLICATIONS

Andresen et al. "Thermodynamics in Finite Time", Physics Today, vol. 37, pp. 62-70, (Sep. 1984).
Bizarro et al. "The Thermodynamic Efficiency of Heat Engines with Friction", American Journal of Physics, vol. 80, No. 4, pp. 298-305, (Apr. 2012).
Curzon et al. "Efficiency of a Carrot Engine at Maximum Power Output", American Journal of Physics, vol. 43, pp. 22-24, (Jan. 1975).
Geyko et al. "Reduced Compressibility and an Inverse Problem for a Spinning Gas", Physical Review Letters, vol. 110, Article 150604-4, (Apr. 2013).
Liew et al. "3D Velocimetry and Droplet Sizing in the Ranque-Hilsch Vortex Tube", Experiments in Fluids, vol. 54. (Apr. 2012).
Liew et al. "Maxwell's Demon in the Ranque-Hilsche Vortex Tube", Physical Review Letters, vol. 109; Article 054503-1; (Aug. 2013).
Mozurkewich et al. "OPtimal Paths for Thermodynamic Systems: The Ideal Otto Cycle", Journal of Applied Physics, vol. 53. pp. 34-42, (Jan. 1982).
Rubin, M. "Optimal Configuration of a class of Irreversible Heat Engines, Part I" Physical Review A, vol. 19, No. 3, (Mar. 1979).
Rubin, M/ "Otimal Configuration of a class of Irreversible Heat Engines, Part II" Physical Review A, vol. 19, No. 3, (Mar. 1979).
Sieniutycz, S. "Thermodynamic Limits on Production or Consumption of Mechanical Energy in Practical and Industrial Systems" Progress in Energy and Combustion Science, vol. 29, pp. 193-246, (Feb. 2003).

* cited by examiner

OTTO AND DIESEL CYCLES EMPLOYING SPINNING GAS

CROSS-REFERENCE TO PRIOR FILED APPLICATIONS

This application claims the benefit of U.S. Provisional Application No. 61/971,320, filed Mar. 27, 2014, which is incorporated herein in its entirety.

STATEMENT REGARDING FEDERALLY SPONSORED RESEARCH OR DEVELOPMENT

This invention was made with government support under Grant No. DE-AC02-09CH11466 and Grant No. DE-FG52-08NA28553 awarded by the Department of Energy and Grant No. HDTRA1-11-1-0037 awarded by the Defense Threat Reduction Agency, administered by the Office of Naval Research. The government has certain rights in the invention.

TECHNICAL FIELD

This invention relates generally to internal combustion engines and in particular internal combustion engines in which the working gas is made to rotate or spin substantially at the sound speed.

BACKGROUND OF THE INVENTION

A gas spinning at sonic velocities has an effectively higher heat capacity, which can be used to modify engine fuel cycles. A remarkable gain in fuel efficiency is shown to be theoretically possible for the Otto and Diesel cycles. Neglecting inefficiencies in producing the spinning, the theoretical maximum fuel efficiencies of Otto cycle engines might be increased by as much as 10%-40% at conventional engine temperatures. Low-temperature, clean-burning engine cycles might, in principle, benefit even more from a spinning working gas. The new limit neglects such non-ideal effects as friction, insufficient mixing, or heat transfer, but if successful, would suggest transformative technology.

In using spinning gas in an engine, the spin must be rapid enough to affect the moment of inertia of the gas. That would equip the gas with higher heat capacity, leading to potentially very large benefits in efficiency. This rapid spinning is very different from the modest spinning that people have suggested for controlling say the mixing of the fuel. The main technological hurdles in rapid spinning involve initiation of the spinning, efficient recovery of the spinning energy, and control of turbulence.

By exploiting rotation-dependent heat capacity, a possibility that had never been considered, a radically new invention in the field of thermal cycle internal combustion engines is possible. None of the practical engine cycles, such as Otto cycle, Diesel cycle, Miller cycle or Atkinson cycle, employ anything like such an effect.

BRIEF SUMMARY OF THE INVENTION

An internal combustion engine is disclosed. The internal combustion engine includes a main cylinder and main piston that are relatively axially displaceable along a main axis to define a variable volume main working chamber. At least one valve is configured to admit air and fuel into the working chamber forming an air/fuel mixture. The main cylinder is configured to cause the air/fuel mixture in the main cylinder to spin rapidly enough to cause a substantive change in the heat capacity of the air/fuel mixture creating a spinning air/fuel mixture. The main cylinder and main piston are configured to compress the spinning air/fuel mixture to create an ignitable spinning air/fuel mixture. The main cylinder is also configured to ignite the rotating gas thereby creating an ignited spinning air/fuel mixture. The main cylinder and main piston are configured to extract mechanical energy from the ignited spinning air/fuel mixture. An exhaust valve is configured to exhaust combustion products from the main working chamber.

At least one intake valve may be arranged tangential to a surface of the main cylinder to initiate rotation of the air/fuel mixture to produce an intake of gas with a net angular momentum about the main axis. Rotation may be generated and slowed down through use of a flywheel. The spinning air/fuel mixture may rotate at 0.8 of thermal molecule speed or higher. The air/fuel mixture has a heat capacity and the spinning air/fuel mixture may rotate at sufficient velocity to substantially increase the heat capacity by at least 2% due to spinning of the spinning air/fuel mixture. The maximum combustion temperature may be in the range from 900° K to 2000° K. The main cylinder may be configured with a compression ratio in the range from 5:1 to 20:1. The ignited spinning air/fuel mixture may produce an efficiency gain of the order of 10-40% at conventional engine temperatures compared with engines that do not use a spinning air/fuel mixture. An amount of heat released per gas particle over maximum temperature during combustion may be on the order of 1.5-2, where the temperature is taken in energy units.

Another internal combustion engine embodiment is also disclosed. The internal combustion engine includes a main cylinder and main piston that are relatively axially displaceable along a main axis to define a variable volume main working chamber. At least one valve is configured to admit air and fuel into the working chamber forming an air/fuel mixture. A slave chamber is coupled to the main working chamber, the slave chamber being configured to cause the air/fuel mixture in the main cylinder to spin rapidly enough to cause a substantive change in the heat capacity of the air/fuel mixture creating a spinning air/fuel mixture. The main cylinder and main piston are configured to compress the spinning air/fuel mixture to create an ignitable spinning air/fuel mixture. The main cylinder is configured to ignite the rotating gas thereby creating an ignited spinning air/fuel mixture. The main cylinder and main piston are configured to extract mechanical energy from the ignited spinning air/fuel mixture. An exhaust valve is configured to exhaust combustion products from the main working chamber.

The slave chamber may be substantially co-axial about and mutually displaced on the main axis and in communication at a cross section at which gas in the main chamber expands as it flows from the main chamber into the slave chamber. A rotational velocity of the spinning air/fuel mixture in the main chamber may be increased as the air/fuel mixture flows from the main chamber to the slave chamber. At least one intake valve may be arranged tangential to a surface of the main cylinder to initiate rotation of the air/fuel mixture to produce an intake of gas with net angular momentum about the main axis. The spinning air/fuel mixture may rotate at 0.8 of thermal molecule speed or higher. The air/fuel mixture has a heat capacity and the spinning air/fuel mixture may rotate at sufficient velocity to substantially increase the heat capacity by at least 2% due to spinning of the spinning air/fuel mixture. The main cylinder may be configured with a compression ratio in the range from 5:1 to 20:1. At temperatures characteristic of conventional engines, the ignited spinning air/fuel mixture may produce an efficiency gain of the order 10-40% at conventional temperatures compared with engines that do not use a spinning air/fuel mixture. The slave cylinder may have a length that is approximately 5-10 times the main cylinder length.

In a further preferred embodiment, the maximum temperature during combustion may be much lower than conventional engines temperatures, even as low as approximately 926° K to reduce NOx emissions. In this case, the ignited spinning air/fuel mixture may produce an efficiency gain much greater than engines that do not use a spinning air/fuel mixture. At such low temperatures, engines that do not use a spinning air/fuel mixture may even fail to ignite.

DETAILED DESCRIPTION

A rotating gas has a rotation-dependent heat capacity, which can be used to enhance the efficiency of the internal combustion engine. Practical fuel cycles are far from the Carnot efficiency. A gas spinning at near sonic velocities increases the heat capacity enough to allow these fuel cycles to approach more closely the Carnot efficiency. In fact, a gain in fuel efficiency of several percent is shown to be theoretically possible for the Otto and Diesel cycles at conventional engine temperatures. The new limit neglects such non-ideal effects as friction, insufficient mixing, or heat transfer.

The introduction of swirl, such as in the Chrysler Hemi engine, and other associated ideas (Prasad, Galbraith), such as for cooling surfaces, are concerned with the use of swirl for creating the right amount of turbulent mixing for the fuel-air combustion. The swirl velocities in such engines are substantially subsonic. The turbulent motion is intensified by the swirl and that leads to improved mixing.

In contrast, disclosed herein are techniques to affect the Otto cycle thermodynamic efficiency by increasing the effective heat capacity of the gas, e.g., the air/fuel mixture. Gas rotation can be described in terms of spinning parameter $\varphi$ that is square proportional to the ratio of maximum spinning velocity, which occurs at the wall for substantially solid body rotation, to the sound speed or mean thermal molecule speed $\sqrt{(3T/m)}$. For solid body rotation with angular velocity $\omega$ and temperature T we denote $\varphi=m\omega^2 r^2/2T$, where m is the mass of gas molecules. In the case of a mixture of gases, m may be taken as the average molecular mass, namely the total gas mass divided by the total number of gas molecules. If the gas rotates at near sonic velocities, e.g. gas flow speed at the periphery of the cylinder is 0.8 thermal molecule speed and above, then the effective heat capacity of the gas increases. That is because the moment of inertia of the rotating gas changes, so compressing it axially, makes it rotate faster. Conventional engines using lower speed "swirling" have no appreciable impact on the effective heat capacity of the air/fuel mixture. The energy is thus stored in rotation energy can then be comparable to the thermal content. In principle, the Otto cycle is then more efficient, an effect that is more pronounced at low temperatures. But this approach will not work at substantially subsonic speeds e.g., less than 0.8 of the mean thermal speed of the gas molecules. At near sonic velocities, gas rotation carries about 20% of the total gas energy, hence, yields a noticeable heat capacity increase e.g., 2% or higher.

The rotation-dependent heat capacity effect: For slow enough compression or expansion, such that the gas is close to thermodynamic equilibrium, there is a rotation-dependent heat capacity effect. This effect can be understood as follows: Consider a gas at temperature T to be rotating in a frictionless cylinder, so that angular momentum is conserved. In the absence of the rotation, compressing from the ends the cylinder simply heats the gas, with temperature rising according to the ideal gas law. Now consider that, to the extent that the centrifugal forces exceed the thermal pressure forces the rotation flings the gas molecules to the cylinder walls. But, under compression, the gas adiabatically heats up, forcing molecules away from the walls, thereby decreasing the moment of inertia. Since angular momentum is conserved, the angular velocity must increase, as does the energy of rotation. Thus, some of the energy exerted in compressing the gas goes to increase the temperature while some goes to increase the rotation energy. This effect can be described as a rotation-dependent heat capacity, because the gas is "softer" to compress from the ends when it is rotating. The effect is large when the rotation velocities are close to the sound speed of the gas. In particular, under axial compression, in the limit of high rotation, the specific heat $c_v$ is increased by 1.

Figure 1:
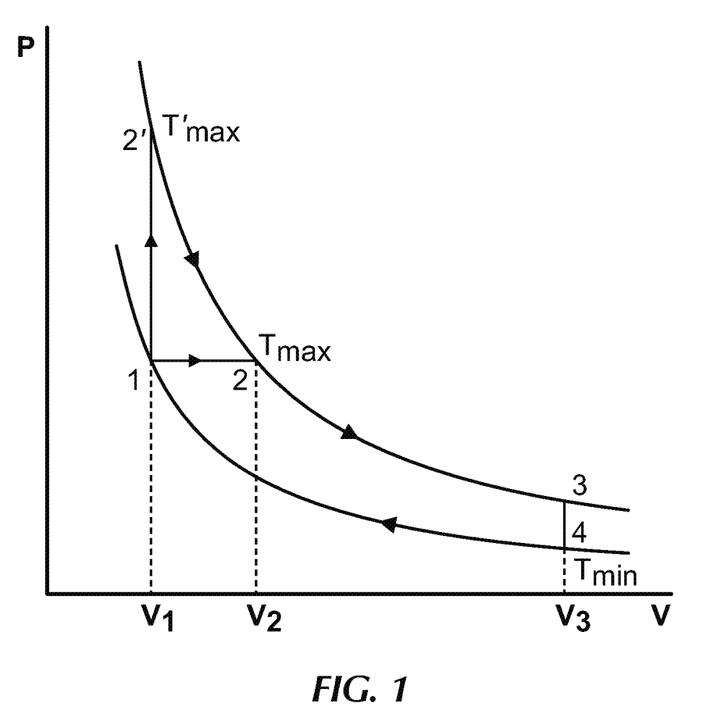
FIG. 1 is a graph showing the Otto and Diesel cycles.

Engine Efficiency with Spinning Gas: The rotation-dependent heat capacity of the spinning gas appears can be used in practical fuel cycles. FIG. 1 is a graph showing the Otto cycle which includes adiabatic compression and expansion processes, separated by ignition and rejection of heat processes at constant volume. Consider the Otto cycle from state 1 to 2' to 3 to 4. Alternatively, consider the Diesel cycle, from state 1 to 2 to 3 to 4. Heat is transferred either at 1 to 2' or 1 to 2 as combustion occurs. The power stroke, wherein energy is transferred to the piston, occurs at the transition 2' to 3 in the case of the Otto cycle or 2 to 3 in the case of the Diesel cycle. The Otto cycle efficiency depends only on the volumetric compression ratio $n=V_{max}/V_{min}$, and is given by $\eta_0=1-n^{1-\gamma}$, where $\gamma=c_p/c_v$. Given a minimum to maximum temperature ratio of $\delta$, and a ratio q of total heat per particle to maximum temperature, that efficiency can be cast in the form $\eta_0=1-\delta/(1-q/c_v)$. However, by spinning the gas, say initiated by vortex injection, the efficiency increases (for small q) by $q\delta/c_v c_p$, which can be as much as 10 to 40%, over and above Otto cycle efficiencies at conventional engine temperatures. For low maximum temperatures, δ is larger, while the base efficiencies become smaller, so that relative efficiencies are even higher. Using a flywheel to slow down or speed up the spinning gas can give even a somewhat larger efficiency.

Figure 2:
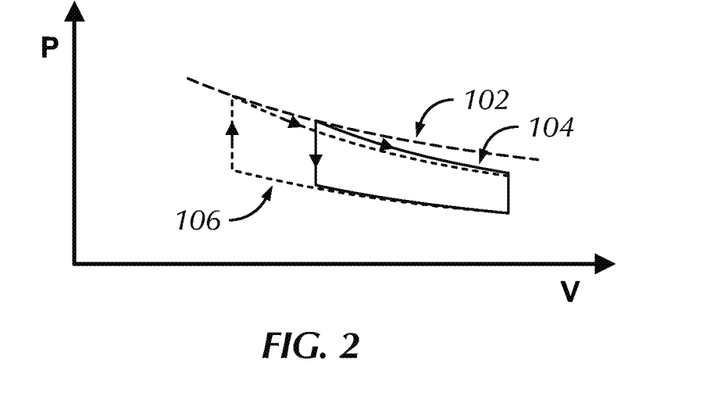
FIG. 2 is a graph showing the Otto cycle modified with spinning gas.

FIG. 2 is a graph showing the Otto cycle modified with spinning gas. Now consider what happens if added rotation-dependent heat capacity is possible. In this case, the compression stroke 1 to 2' can be carried further without the temperature rising further than $T_{max}$. The red curve 102 is the temperature constraint. The black curve 104 denotes a non-spinning case; the green curve 106 denotes spinning case. Note that the spinning case allows compression to smaller volumes and higher pressures, while still remaining below the maximum temperature.

The spinning gas thermal cycle thus can operate as follows. First, the flywheel produces some initial rotation. The gas is then compressed and heated. The fuel is then burned and the gas expands. Lastly, the gas is slowed down by the flywheel, which cools it further. The total amount of work done in the cycle is the sum of two adiabatic compressions and two gas rotations with the flywheel. Note that, after the first stage of spinning injection, the gas heats up, thereby increasing the minimum temperature from where the adiabatic compression starts. Since the maximum temperature is constrained, the total amount of heat q received from the combustion is also constrained. The best way to cool is actually to cool down while spinning up, such that temperature in fact remains constant. A completely isothermal process is not feasible because it would take infinitely long, but, to the extent that it can be reached, it gives the highest efficiency. The process of spinning while cooling is not completely infeasible, because it is done at the ambient temperature, for which a thermal reservoir with infinite heat capacity at $T_{min}$ is readily available. Of course, higher efficiency yet would be reached to slow down the spinning also at constant temperature, but for that process there is no heat reservoir with the appropriate temperature.

In summary, the Otto cycle with spinning gas has the following processes: one, isothermal spinning injection; two, adiabatic compression; three, isochoric heating; four, adiabatic expansion; and five, adiabatic spinning ejection. Similarly, the diesel cycle can be improved by spinning prior to the compression stroke.

Figure 3:
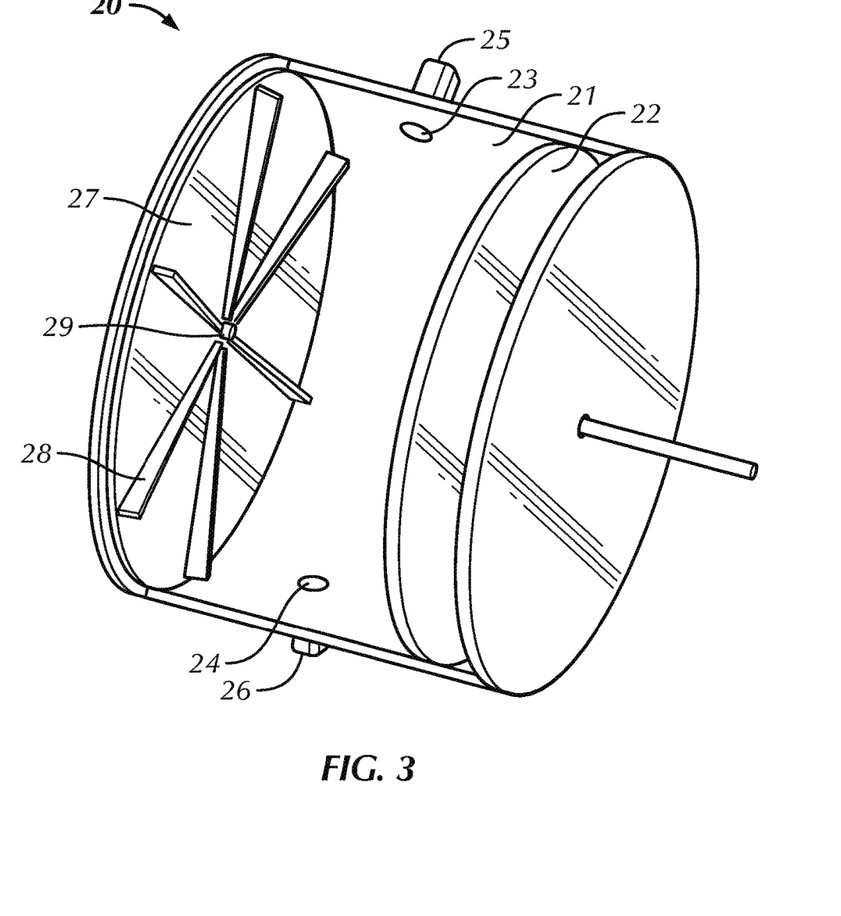
FIG. 3 is a schematic diagram of an engine chamber with spinning gas.

FIG. 3 is a schematic diagram of an engine 20 with spinning gas. The engine 20 includes a cylinder 21 alternatively called the combustion chamber. A piston 22 is displaceable along the axis of the cylinder via a connecting rod 32 so as to change the volume in the ignition region. The engine 20 includes an exhaust valve 23 configured to allow the exhaust of spent fuel. The engine 20 includes an intake valve 24 may be arranged tangential to the cylinder surface so as to produce an intake of gas with net angular momentum about the cylinder axis. The engine 20 includes an exhaust manifold 25 that is configured to exhaust spent fuel when exhaust valve 23 is open. An intake manifold 26 is configured to admit gas when the intake valve 24 is open. The engine also includes a flywheel 27 is equipped with flywheel blades 28. A fuel injector 29 is also provided and may also serve as a spark plug. It should be understood that the flywheel 27 may be driven be a variety of mechanical techniques as is well known in the art.

Figure 4:
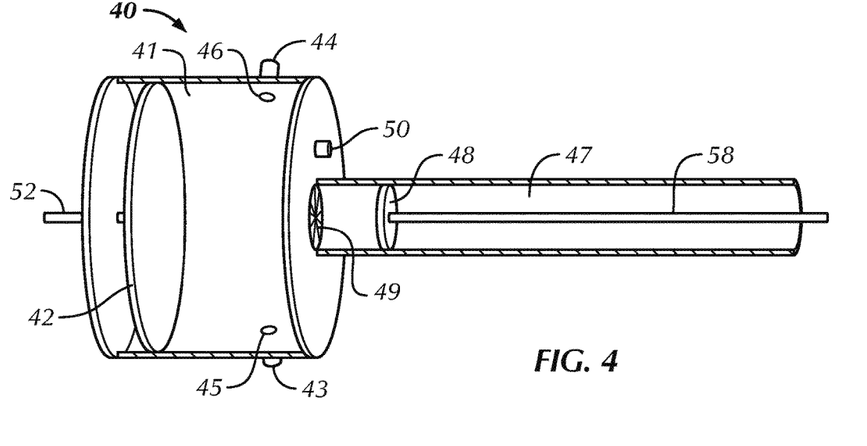
FIG. 4 is a diagram engine with spinning gas using a pinhole configuration.

FIG. 4 is a diagram engine 40 with spinning gas using a pinhole configuration. In this configuration, two chambers are used. The main cylinder 41 is where combustion takes place. The volume of the main cylinder is regulated by main piston 42 and its associated connecting rod 52. Spent gases are removed through exhaust manifold 43 when exhaust valve 45 is open. Gas is admitted to main cylinder 1 (master cylinder) through intake manifold 44 when intake valve 46, is open. The valve 46 may be arranged tangential to the cylinder surface so as to produce an intake of gas with net angular momentum about the cylinder axis. A slave cylinder 47 is arranged co-axially with the main cylinder 41. The slave cylinder 47 includes a slave piston 48 that is displaceable via a slave piston connecting rod 58. A between-cylinders valve (BCV) 49 is disposed between the main cylinder 41 and the slave cylinder 47. With the BCV 49 open, gas is released from the main cylinder 41 but with little angular momentum during which time slave piston 48 is retracted so as to increase the gas volume of slave cylinder 47 thereby to create suction of gas from main cylinder 41. The BCV is closed during combustion, which is initiated by spark plug 50, which may also be used as a fuel injector.

During operation of the pinhole configuration, the initial temperature is T=300° K and the initial spinning parameter φ=0.5. In this example, the lengths of the master and slave cylinders are $L_1$=10 cm, $L_2$=60 cm respectively; and radii are $R_1$=10 cm, $R_2$=5 cm respectively. The compression ratio is R=5; the heat per initial number of particles over maximum temperature during the cycle is q=0.778. Estimated maximum temperature is $T_{max}$=927° K and efficiency is 31.8%, which is 32% higher than the base efficiency. By base efficiency we mean the efficiency of a conventional non-spinning gas Otto cycle engine operating at the same maximum temperature.

Figure 5:
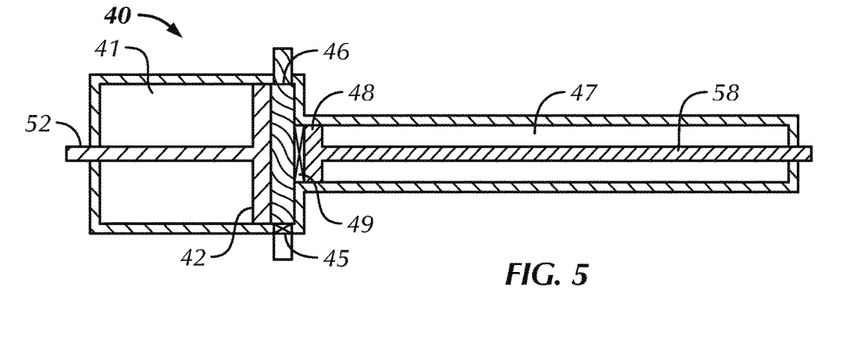
FIG. 5 shows the initial configuration of the pinhole configuration engine during before operation begins.

FIGS. 5-13 show general operation of the pinhole configuration engine shown in FIG. 4. In FIGS. 5-13, the density gradient corresponds to the density of a spinning, inhomogeneous gas. The temperature is color-coded: cold (purple) through hot (red). Engine operation includes the following steps with approximate operational parameters:

FIG. 5 shows the configuration of the engine 40 prior to operation. The BCV 49 is closed. The exhaust valve 45 is closed. The intake valve 46 is open. The main piston 42 is in an upper position, e.g., top dead center or TDC, to minimize the volume in master cylinder 41. The main cylinder 41 is essentially empty. In principle, the main cylinder 41 may contain a small amount of gas or heavy aerosol particles that carry angular momentum left from the previous stroke. Alternatively, after the engine has been running, the initial configuration has the same valve and piston settings, except that the initial temperature of the residual gas is somewhat higher as in FIG. 13 discussed below.

Figure 6:
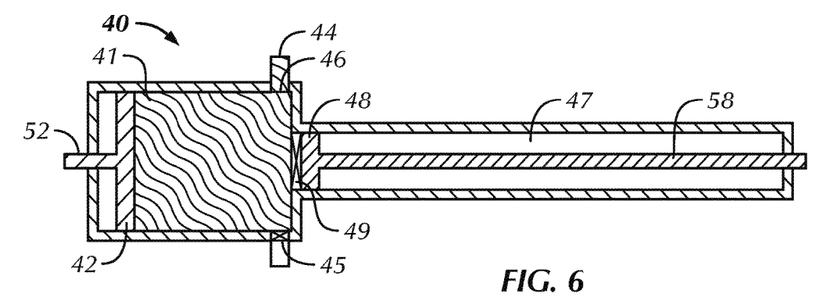
FIG. 6 shows the engine after stage 1, the air intake stage.

Stage 1—Air Intake: FIG. 6 shows the engine 40 after the air intake stage. The main piston 42 moves down while the air (or possibly air-fuel mixture) is sucked in under external pressure tangentially through intake manifold 44. The initial tangential velocity inside the main cylinder creates the initial, subsonic rotation, with spinning parameter φ=0.5 and initial temperature T=300° K.

Figure 7:
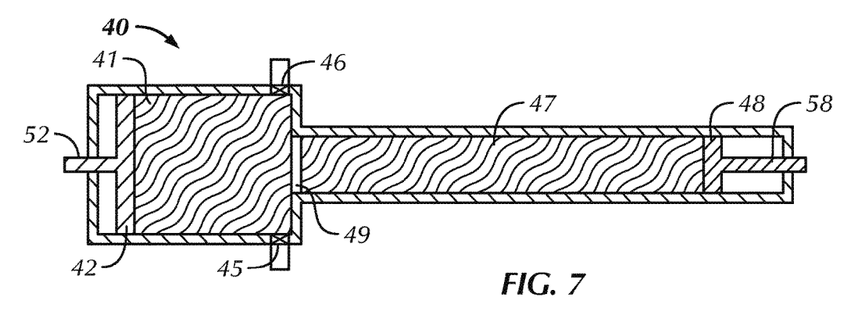
FIG. 7 shows the engine after stage 2, the pre-compression stage in which both the exhaust valve and intake valve are closed.

Stage 2—pre-compression: FIG. 7 shows the engine 40 after stage 2, the pre-compression stage in which both the exhaust valve and the intake valve are closed. The BCV 49 is open. Slave cylinder piston 48 moves so as to increase the volume of slave cylinder 47 and suck in air from the master cylinder 41. Due to angular momentum conservation and energy balance, angular velocity of the gas increases while temperature decreases. This causes the spinning parameter in the main cylinder 41. The spinning gas in the main cylinder 41 is generally shown by reference number 60. Total displacement of the slave piston 48 in the slave cylinder is reached, in this example 60 cm. The spinning parameter in the main cylinder 41 is φ=1.346 (i.e., supersonic spinning) and T=214° K. The main cylinder 41 now contains 0.542 of total gas particles, and the slave cylinder 47 contains 0.458. Angular velocities and temperatures are assumed to be the same.

Figure 8:
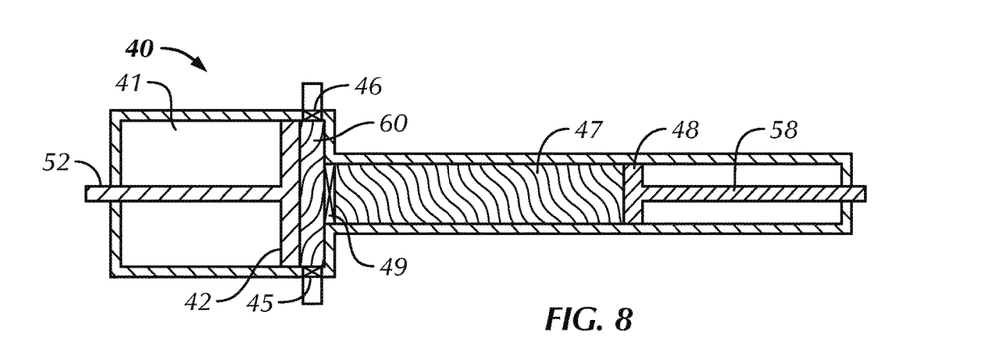
FIG. 8 shows the engine after stage 3—the compression stroke.

Stage 3—Compression: FIG. 8 shows the engine 40 after stage 3—compression. The BCV 49 is closed and the spinning gas in the main cylinder 60 is compressed to compression ratio R=5. Meanwhile, the spinning gas in the slave cylinder 47 is also compressed to L=26.94 cm, so as to match final force on the BCV after main cylinder decompression.

Figure 9:
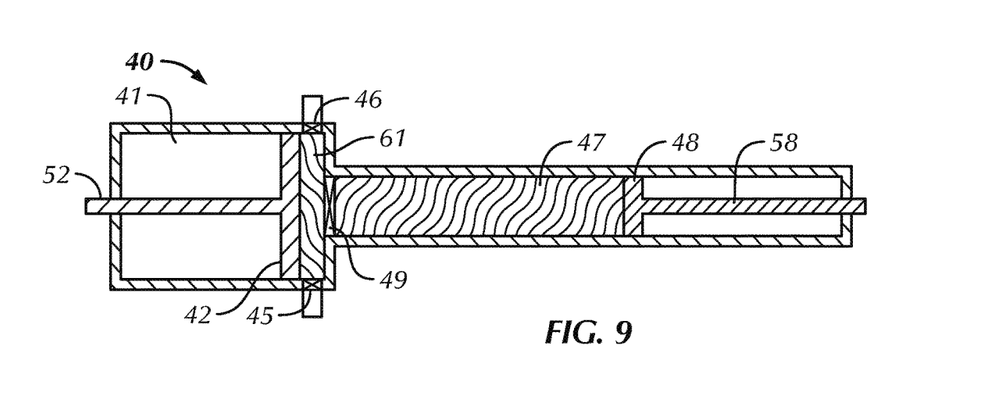
FIG. 9 shows the engine after stage 4—the fuel injection stage.

Stage 4—fuel injection. FIG. 9 shows the engine 40 after stage 4—the fuel injection stage. It should be understood that fuel injection can alternatively take place at Stage 1, depending on the fuel and the cycle that is run (either Otto or Diesel). The resulting spinning air/fuel mixture is generally shown by reference number 61. The spinning air/fuel mixture 61 is then ignited (via a spark plug for an Otto cycle or by compression in a Diesel engine). In the case when the amount of heat released per particle normalized to maximum temperature is $q=Q/(NT'_{max})=1$, the spinning parameter decreases and temperature reaches its maximum: φ=0.403, T=927° K.

Figure 10:
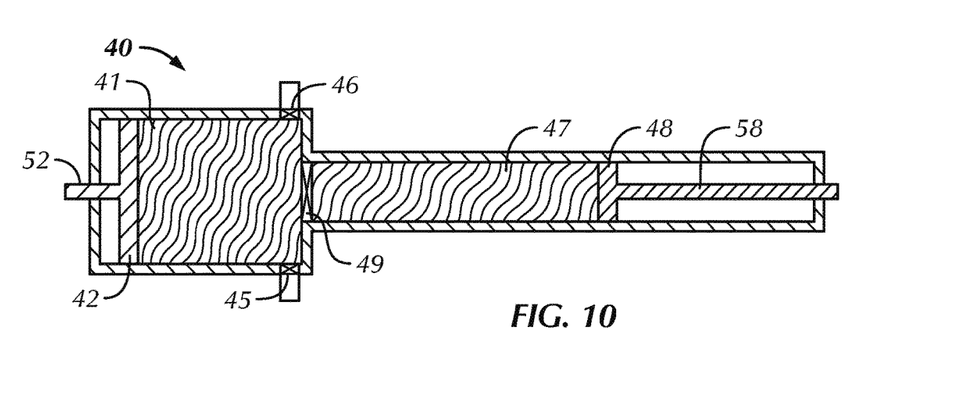
FIG. 10 shows the engine after stage 5—the power stroke.

Stage 5—power stroke. FIG. 10 shows the engine 40 after stage 5—the power stroke. The main cylinder piston 42 moves back to bottom dead center, producing positive work. The final state is described by φ=0.699, T=489° K.

Figure 11:
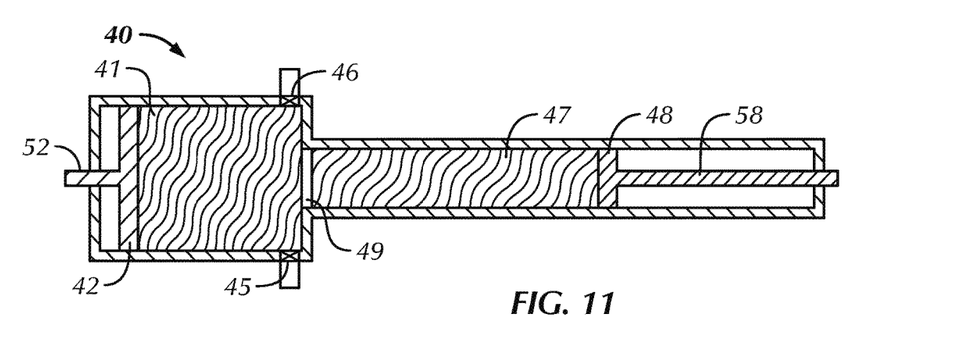
FIG. 11 shows the engine after stage 6—the equilibrium the stage.

Stage 6—equilibrium. FIG. 11 shows the engine 40 after stage 6—the equilibrium stage. The BCV 49 is open and the gases in the main cylinder 41 and the slave cylinder 47 reach equilibrium with φ=0.649, T=406° K. In principle there are many ways to equilibrate the two gases in the main and slave cylinders. However equilibration of total forces is preferred, since it produces no entropy losses related to fluid type motion.

Figure 12:
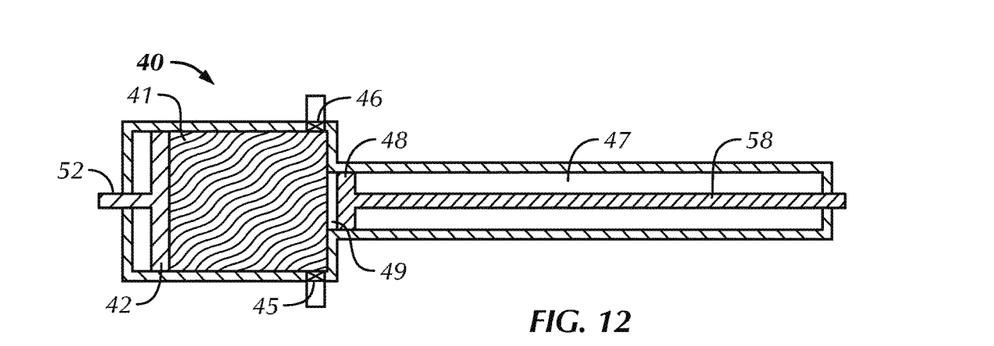
FIG. 12 shows the engine after stage 7—the pre-exhaust stage.

Stage 7—pre-exhaust. FIG. 12 shows the engine 40 after stage 7—the pre-exhaust stage. The BCV 49 is open and the slave cylinder piston 48 moves down pushing all the gas to the main cylinder 41. The gas in the main cylinder 41 heats up to φ=0.319 and T=495° K. After that, the BCV 49 is closed. The slave cylinder piston 48 is returned to the initial state.

Figure 13:
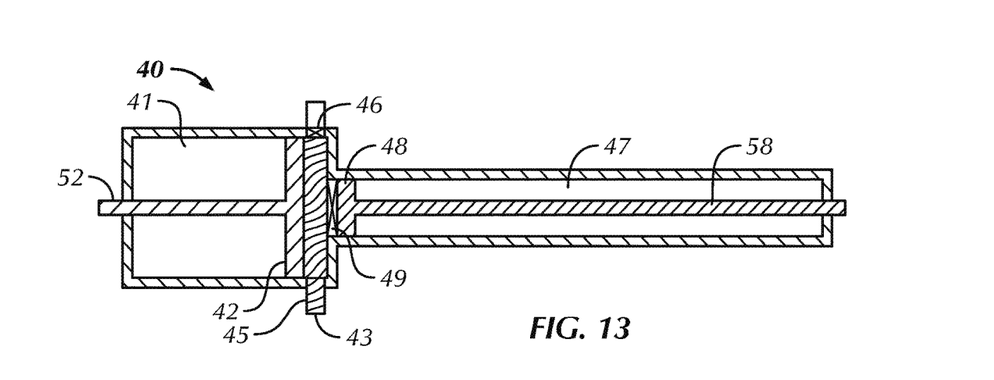
FIG. 13 shows the engine after stage 8—the exhaust stage.

Stage 8—exhaust: FIG. 13 shows the engine 40 after stage 8—the exhaust stage. The exhaust valve 45 is open and the main piston 42 pushes the gas in the main cylinder 41 out of the exhaust manifold 43. This step returns the engine configuration to the initial configuration prior to stage 1. Notice, that gas the main cylinder 41 has higher temperature and, hence, higher pressure than initially. Therefore it may be used to compress the new portion of the gas and push it inside the main cylinder 41 for the new cycle.

Preferred Operating Range

It is a further advantage that the methods taught here may be utilized particularly at low temperatures, where conventional engines cannot operate or can operate only with extremely poor efficiency. Attached table below demonstrates regime parameters where proposed engine has significant gain in efficiency and operates at low temperatures.

| R | M | q | $T_{max}$ (° K) | η | $η_0$ | x |
|---|---|---|---|---|---|---|
| 5 | 1.5 | 0.778 | 926 | 0.318 | 0.241 | 0.318 |
| 10 | 3 | 0.716 | 1257 | 0.423 | 0.304 | 0.394 |
| 15 | 3.75 | 0.609 | 1181 | 0.471 | 0.367 | 0.284 |

In the table: $R=V_{max}/V_{min}$ compression ratio of the master cylinder, $M=V_s/V_m$ ratio of the volumes of the slave cylinder and master cylinder with fixed radii ratio $R_m/R_s=2$, q is the ratio of total heat produced in combustion reaction per one particle on the gas and maximum temperature during the cycle, η is efficiency of the thermal cycle, $η_0$ is the efficiency of conventional Otto cycle with the same maximum temperature constrain, x is efficiency gain, i.e. $x=η/η_0-1$.

Operating at low temperatures is very beneficial since it helps to avoid the NOx and soot production that is common during high temperature combustion. Although conventional engine efficiency decreases as the maximum temperature decreases, the use of the disclosed engine is very beneficial, since it produces even higher gains in the case of an otherwise low efficiency Otto cycle, for example, when the maximum combustion temperature is lower than the conventional engine temperatures.

It should be understood that many variations are possible based on the disclosure herein. Although features and elements are described above in particular combinations, each feature or element can be used alone without the other features and elements or in various combinations with or without other features and elements.

What is claimed is:

1. An internal combustion engine comprising:
    a variable volume main working chamber, the main working chamber comprising:
        a main cylinder;
        a main piston disposed within the main cylinder, the main piston being axially displaceable along a main axis; and
        an intake valve configured to admit air into the main working chamber when the intake valve is open, the air axially rotating when in the main working chamber;
    a variable volume slave chamber coupled to the main working chamber, the slave chamber comprising:
        a slave cylinder; and
        a slave piston disposed within the slave cylinder, the slave piston being axially displaceable along the main axis; and
    a between-cylinders valve (BCV) disposed between the main cylinder and the slave cylinder, the BCV configured to selectively:
        open to release the axially rotating air into the slave chamber to create spinning air in the main working chamber that axially rotates rapidly enough to cause a substantive change in the heat capacity of the spinning air with fuel to be admitted in the main working chamber after the substantive change in the heat capacity of the spinning air to create an air/fuel mixture; and
        close to allow for combustion of the air/fuel mixture.

2. The internal combustion engine according to claim 1 wherein a rotational velocity of the spinning air in the main chamber is increased as the air flows from the main chamber to the slave chamber.

3. The internal combustion engine according to claim 1 wherein the intake valve is arranged tangential to a surface of the main cylinder to produce an intake of gas with net angular momentum about the main axis.

4. The internal combustion engine according to claim 1 wherein the spinning air rotates at 0.8 of thermal molecule speed or higher.

5. The internal combustion engine according to claim 1 wherein the spinning air increases the heat capacity by at least 2% due to spinning of the spinning air.

6. The internal combustion engine according to claim 1 wherein the main cylinder has a compression ratio in a range from 5:1 to 20:1.

7. The internal combustion engine according to claim 1 wherein a length of the slave cylinder is approximately 5 to 10 times a length of the main cylinder.

8. The internal combustion engine according to claim 1 wherein the main working chamber further comprises an exhaust valve configured to exhaust combustion products from the main working chamber when the exhaust valve is open.

9. The internal combustion engine according to claim 1 wherein the main piston is configured to compress the spinning air by decreasing the volume of the main working chamber.

* * * * *